United States Patent
Lee et al.

(10) Patent No.: US 6,594,679 B1
(45) Date of Patent: *Jul. 15, 2003

(54) LEADING-ZERO ANTICIPATOR HAVING AN INDEPENDENT SIGN BIT DETERMINATION MODULE

(75) Inventors: Kyung Tek Lee, Sunnyvale, CA (US); Kevin John Nowka, Round Rock, TX (US); Sang Hoo Dhong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/531,850

(22) Filed: Mar. 20, 2000

(51) Int. Cl.[7] ................................................ G06F 15/00
(52) U.S. Cl. ..................................................... 708/211
(58) Field of Search ................................. 708/205, 505, 708/501, 211, 204, 495, 497

(56) References Cited

U.S. PATENT DOCUMENTS

| | | | | |
|---|---|---|---|---|
| 5,204,825 A | * | 4/1993 | Ng .............................. | 708/205 |
| 5,282,156 A | * | 1/1994 | Miyoshi et al. .............. | 708/505 |
| 5,317,527 A | * | 5/1994 | Britton et al. ............... | 708/205 |
| 5,493,520 A | * | 2/1996 | Schmookler et al. ........ | 708/211 |
| 5,633,819 A | * | 5/1997 | Brashears et al. ........... | 708/505 |
| 5,757,687 A | * | 5/1998 | Naffziger et al. ........... | 708/501 |
| 5,920,493 A | * | 7/1999 | Lau ............................. | 708/205 |
| 6,085,208 A | * | 7/2000 | Oberman et al. ........... | 708/205 |
| 6,178,437 B1 | * | 1/2001 | Dhong et al. ................ | 708/505 |
| 6,360,238 B1 | * | 3/2002 | Dhong et al. ................ | 708/205 |

* cited by examiner

Primary Examiner—Chuong Dinh Ngo
Assistant Examiner—Chat C Do
(74) Attorney, Agent, or Firm—Casimer K. Salys; Bracewell & Patterson, L.L.P.

(57) ABSTRACT

A leading-zero anticipator having an independent sign bit determination module is disclosed. An apparatus for anticipating leading zeros for an adder within a floating-point processor includes a leading-zero anticipator and a sign determination module. The leading-zero anticipator generates a leading zeros string and a leading ones string by examining carry propagates, generates, and kills of two adjacent bits of two input operands of the adder. The leading zeros string is intended for a positive sum, and the leading ones string is intended for a negative sum. Independent of the leading-zero anticipator, the sign determination module determines a sign of the output of the adder in concurrence with the operations within the leading-zero anticipator.

10 Claims, 3 Drawing Sheets

LEADING-ZERO ANTICIPATOR HAVING AN INDEPENDENT SIGN BIT DETERMINATION MODULE

The present patent application is related to copending application U.S. Serial No. 09/270,469, filed on Mar. 15, 1999, entitled: "A LEADING ZERO/ONE ANTICIPATOR HAVING AN INTEGRATED SIGN SELECTOR" (Attorney Docket No. AT9-98-749).

BACKGROUND OF THE INVENTION

1. Technical Field

The present invention relates to an apparatus for data processing in general, and in particular to an apparatus for performing result normalization in a floating-point processor. Still more particularly, the present invention relates to a leading-zero/one anticipator in a floating-point processor.

2. Description of the Prior Art

According to the IEEE 754 standard, floating-point numbers are represented by three elements, namely, a binary sign bit, a binary encoded exponent, and a binary encoded mantissa. In a normalized floating-point number, the exponent is that which ensures the first digit of the mantissa is a logical one (except for special cases such as zero, infinities, and unrepresentable numbers). During a normalized floating-point addition, one of the mantissas of the addend and adder is shifted and the exponent is incremented or decremented until the exponents for both the addend and adder are equal. This shifting process is known as alignment. Once aligned, the mantissas of the addend and adder are added or subtracted depending upon the signs of the addend and adder as well as the type of operation (either addition or substraction) to be performed. Once the result (either sum or difference) is formed, the sign of the resulting mantissa is examined. If the sign of the result is negative, the boolean complement of the result is initially formed, and the sign is then complemented. In order to convert the result to a normalized form, the exponent of the result is decremented and the mantissa of the result is left-shifted until the leading digit of the mantissa is a logical one (in absence of exceptional conditions such as those mentioned supra).

The process of removing leading zeros or leading ones from a respective positive or negative output of a floating-point adder is known as normalization. In the prior art, the process of sign determination is typically accomplished by the floating-point adder. Because it is not obvious a priori whether the result from the floating-point adder will be positive or negative, it is necessary to perform both leading-zero and leading-one analysis until the result is finally available so that a proper normalization shift amount can be selected based upon the sign of the result. Hence, the sign determination process can be the most critical path of a floating-point adder. In lieu of a floating-point adder, a full-precision leading-zero anticipators (LZAs) (or leading-zero predictors) may be utilized to directly determine the sign such that the performance of the normalization process can be improved. The present disclosure describes an improve LZA for performing sign determination.

SUMMARY OF THE INVENTION

In accordance with a preferred embodiment of the present invention, an apparatus for anticipating leading zeros for an adder within a floating-point processor includes a leading-zero anticipator and a sign determination module. The leading-zero anticipator generates a leading zeros string and a leading ones string by examining carry propagates, generates, and kills of two adjacent bits of two input operands of the adder. The leading zeros string is intended for a positive sum, and the leading ones string is intended for a negative sum. Independent of the leading-zero anticipator, the sign determination module determines a sign of the output of the adder in concurrence with the operations within the leading-zero anticipator.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in a variety of processors having a floating-point adder. The processor may be, for example, a reduced instruction set computer (RISC) processor or a complex instruction set computer (CISC) processor. For the purpose of illustration, a preferred embodiment of the present invention, as described below, is implemented on a RISC processor, such as the PowerPC™ processor manufactured by International Business Machines Corporation of Armonk, N.Y.

I. Processor Architecture

Figure 1:
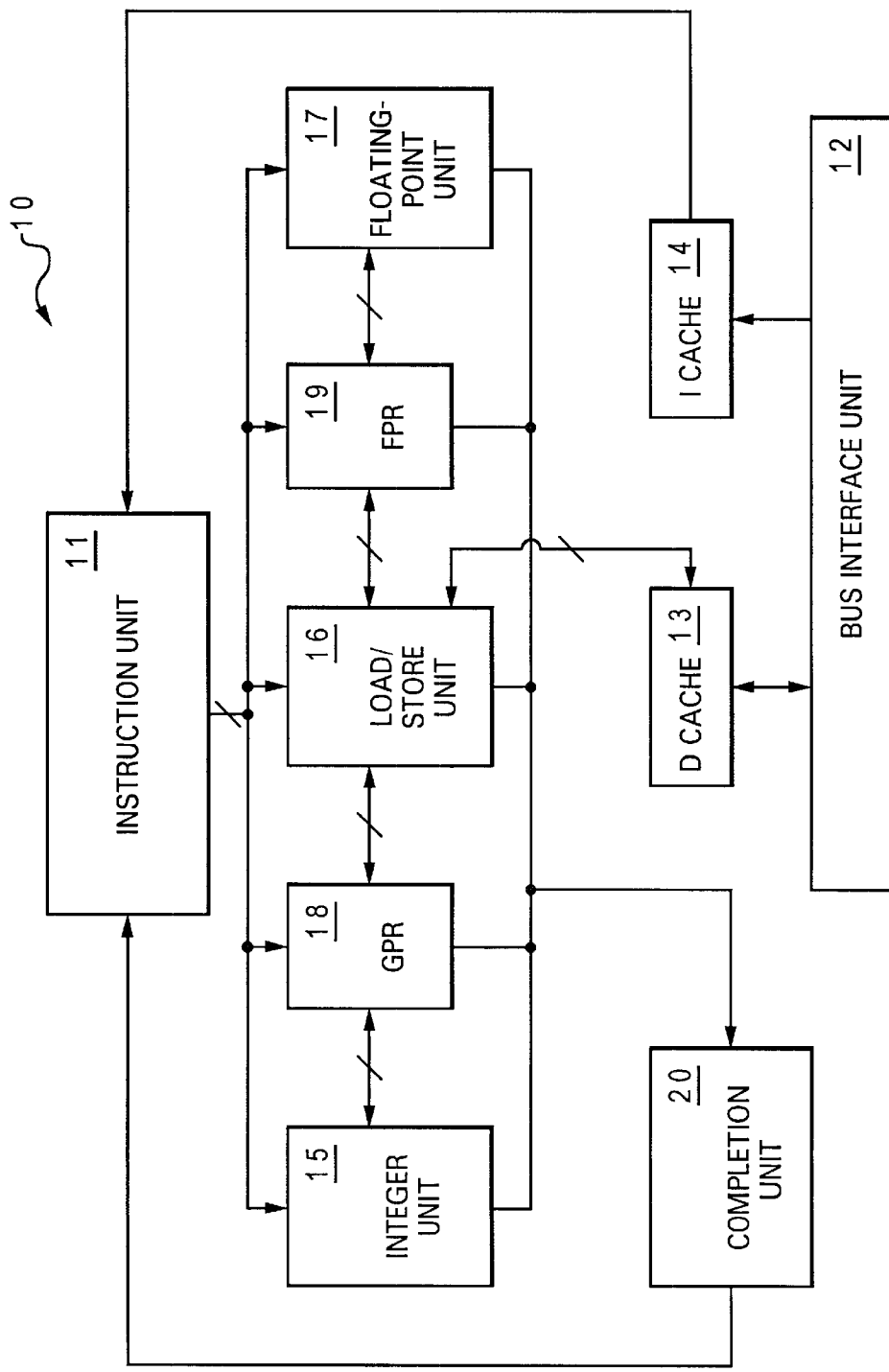
FIG. 1 is a block diagram of a processor in which a preferred embodiment of the present invention may be incorporated.

Referring now to the drawings and in particular to FIG. 1, there is depicted a block diagram of a processor in which a preferred embodiment of the present invention may be incorporated. Within a processor 10, a bus interface unit 12 is coupled to a data cache 13 and an instruction cache 14. Both data cache 13 and instruction cache 14 are high speed set-associative caches which enable processor 10 to achieve a relatively fast access time to a subset of data or instructions previously transferred from a main memory (not shown). Instruction cache 14 is further coupled to an instruction unit 11 which fetches instructions from instruction cache 14 during each execution cycle.

Processor 10 also includes at least three execution units, namely, an integer unit 15, a load/store unit 16, and a floating-point unit 17. Each of execution units 15–17 can execute one or more classes of instructions, and all execution units 15–17 can operate concurrently during each processor cycle. After execution of an instruction has terminated, an execution unit 15–17 stores data results to a respective rename buffer, depending upon the instruction type. Then, any one of execution units 15–17 may signal a completion unit 20 that the instruction unit has finished execution of an instruction. Finally, instructions are completed in program order, and result data are transferred from the respective rename buffer to one of general purpose registers 18 or floating-point registers 19.

II. System Overview

Figure 2:
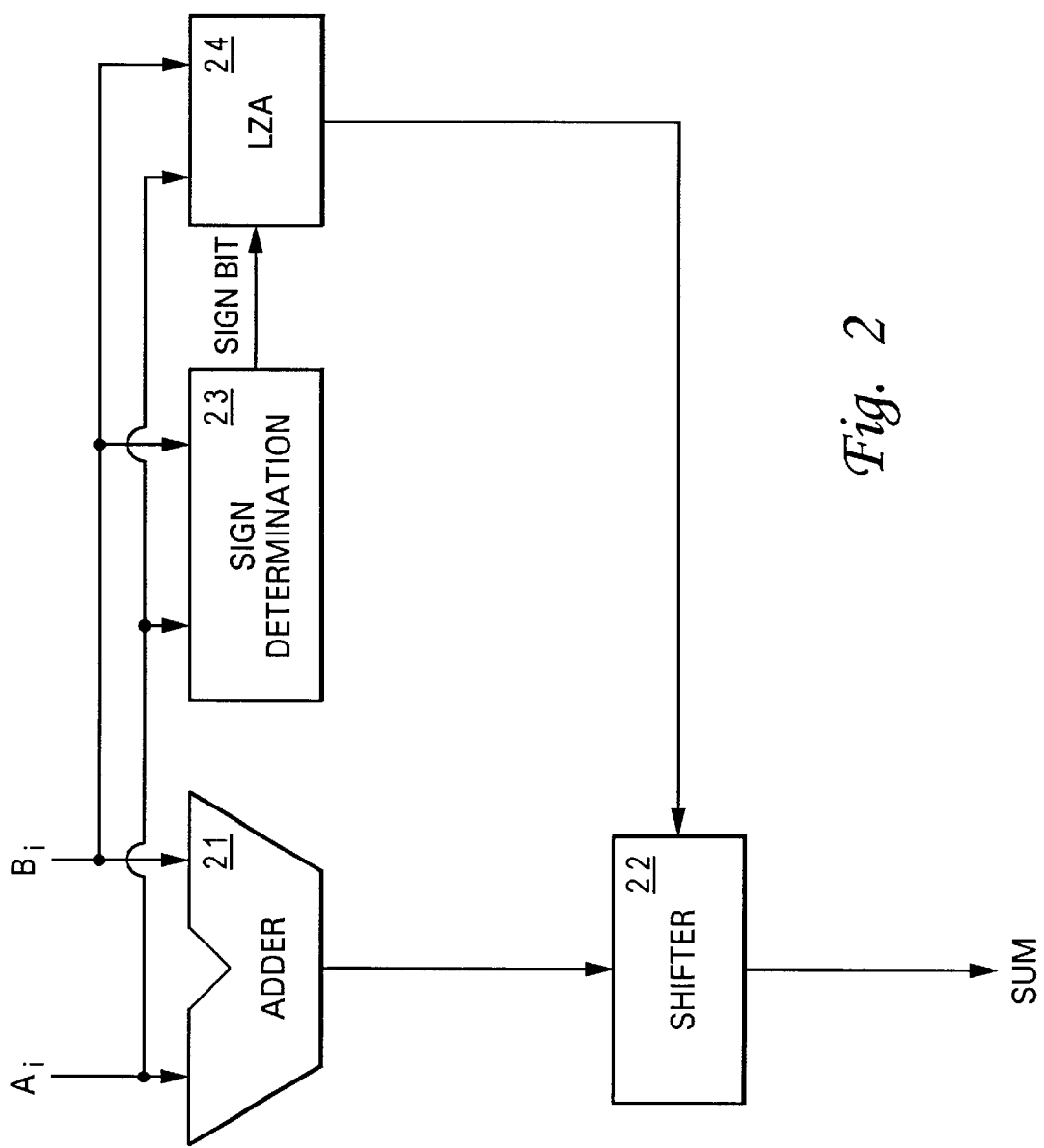
FIG. 2 is a block diagram of a sign determination module in relation to a leading-zero anticipator (LZA) and a floating-point adder, in accordance with a preferred embodiment of the present invention.

With reference now to FIG. 2, there is depicted a block diagram of a sign determination module in relation to a leading-zero anticipator (LZA) within floating-point unit 17 from FIG. 1, in accordance with a preferred embodiment of the present invention. As shown, a LZA 24 operates in parallel with the clocked operation of a floating-point adder 21 to determine the number of bit positions that must be utilized by a shifter 22 to normalize the mantissa of a floating-point result from the addition or substraction of input operands $A_i$ and $B_i$. In order to speed up the normalization process, the mantissas of the addend and adder (or subtrahend and subtractor) are examined to predict the position of the leading logical zeros (or ones) of the floating-point result. This prediction is performed in parallel with the addition (or substraction) operation within adder 21.

In accordance with a preferred embodiment of the present invention, the determination of the sign of the result of the addition or substraction of input operands $A_i$ and $B_i$ is performed by a sign determination module 23. The sign determination is performed in parallel with the calculation of a normalization amount for the sum result within LZA 24. Subsequent normalization shifts are performed by shifter 22, in response to the result from LZA 24.

Broadly speaking, LZA 24 examines carry propagates ($p_i$), generates ($g_i$) and kills ($z_i$) of two adjacent bits of the input operands $A_i$ and $B_i$ to adder 21 to generate a leading zeros string for a positive sum and a leading ones string for a negative sum. As defined, $$p_i = A_i \text{ XOR } B_i \quad (1)$$

$$g_i = A_i \text{ AND } B_i \quad (2)$$

$$z_i = \bar{A_i} \text{ AND } \bar{B_i} \quad (3)$$

Because the sign of the sum result is not known initially, both positive and negative sum strings are computed. The positive sum string determines the location of the first non-zero digit in a positive sum. For each bit position in the string a logical one in the sum string indicates a potential location of the first non-one bit in the sum. By examining the positive sum string from the most significant to the least significant position, the true first non-zero position is determined. The negative sum string determines the location of the first non-one digit in a negative sum. For each bit position in the string a logical one in the sum string indicates a potential location of the first non-one bit in the sum. By examining the negative sum string from the most significant to the least significant position, the true first non-one position is determined.

III. LZA Architecture

Figure 3:
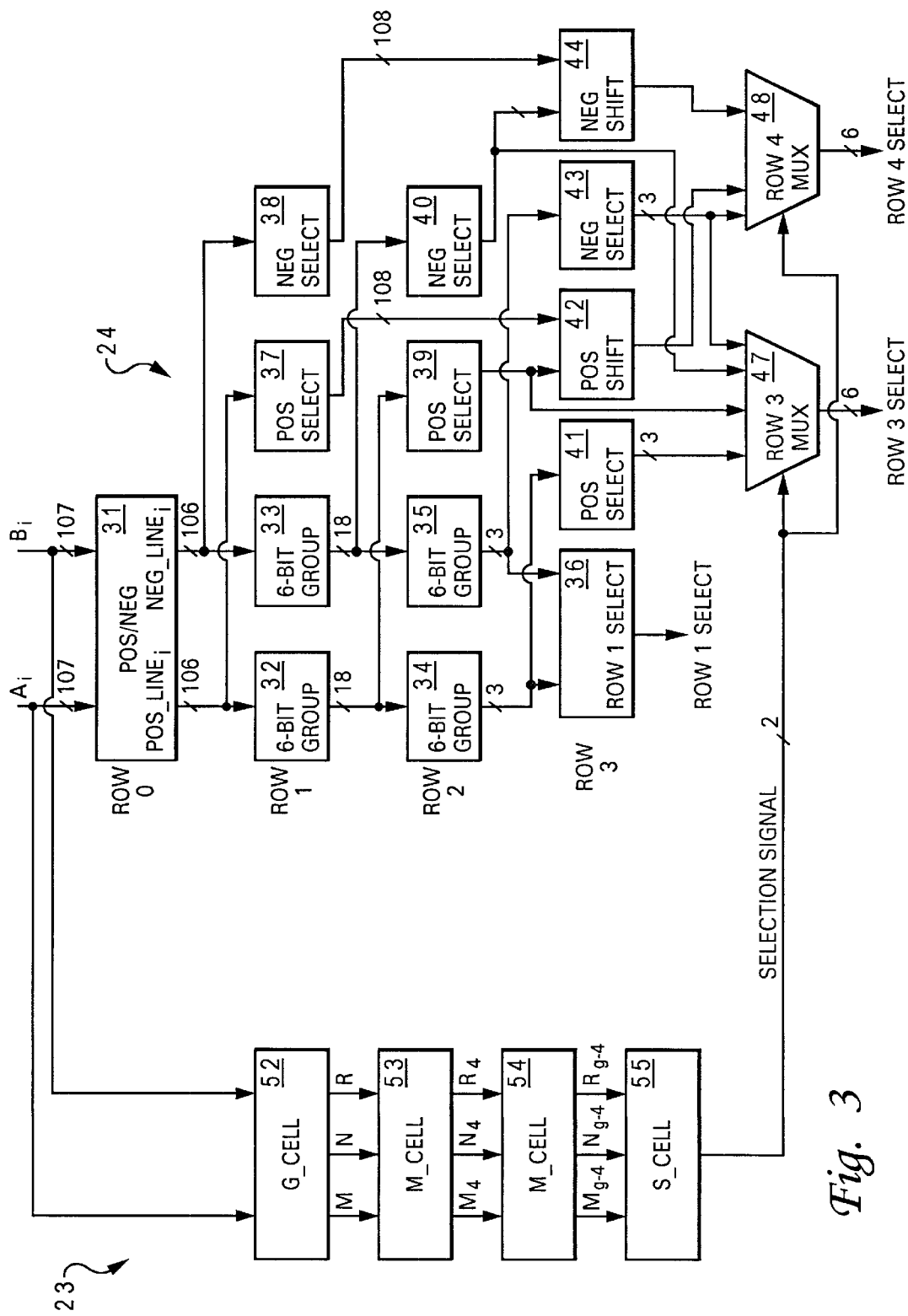
FIG. 3 is a detailed block diagram of the sign determination module along with the LZA from FIG. 2, in accordance with a preferred embodiment of the present invention.

Referring now to FIG. 3, there is illustrated a detailed block diagram of sign determination module 23 along with LZA 24 from FIG. 2, in accordance with a preferred embodiment of the present invention. As shown, positive leading zero line POS_LINE$_i$ and negative leading one line NEG_LINE$_i$ are calculated concurrently from input operands $A_i$ and $B_i$ via a POS/NEG module 31. For the purpose of illustration, each of operands $A_i$ and $B_i$ is 107 bits in length. The positive leading zero line POS_LINE$_i$ and negative leading one line NEG_LINE$_i$ are calculated as follows:

$$\text{POS\_LINE}_i = p_i \text{ XNOR } z_{i+1} \quad (4)$$

$$\text{NEG\_LINE}_i = p_i \text{ XNOR } g_{i+1} \quad (5)$$

where $p_i = A_i$ XOR $B_i$, $g_i = A_i$ AND $B_i$, and $z_i = \bar{A_i}$ AND $\bar{B_i}$.

The positive leading zero line POS_LINE$_i$, which is 106 bits in length, is then divided into 18 groups under Pos Group 32 in row 1, each group having six bits. All six groups are evaluated concurrently, and one bit is computed for each of the 18 groups from Pos Group 32. Each bit represents the logical OR of the six bits within a group. These 18 bits are then divided into three groups under Pos Group 34 in row 2, each group having six bits. All three groups are evaluated concurrently, and one bit is computed for each of the three groups from Pos Group 34. Each bit represents the logical OR of the six bits within a group. Similarly, the negative leading one line NEG_LINE$_i$, which is 106 bits in length, is divided into 18 groups under Neg Group 33 in row 1, each group having six bits. All six groups are evaluated concurrently, and one bit is computed for each of the 18 groups from Neg Group 33. Each bit represents the logical OR of the six bits within a group. These 18 bits are then divided into three groups under Neg Group 35 in row 2, each group having six bits. All three groups are evaluated concurrently, and one bit is computed from each of the three groups from Neg Group 35. Each bit represents the logical OR of the six bits within a group. Finally, the six bits in row 2 (three bits from the POS_LINE$_i$ and three bits from the NEG_LINE$_i$) are priority encoded within ROW 1 select 36 to form the selection of the normalization amount in groups of 36 bits. Thus, these three bits correspond to normalization shift of 0, 36, or 72 bit positions.

All of the above selections are performed by a 12-bit shift-control. For example, if a logical one exists in the first six-bit group within Pos Group 34, a 12-bit shift control calculated from the first six-bit group will be selected. However, if there is no logical one in the first six-bit group but there is a logical one in the second six-bit group, the 12-bit shift control calculated from the second six-bit group will be selected. Otherwise, the 12-bit shift control generated from the third six-bit group will be selected.

The logical expression for the six-bit group logic in row 1 can be summarized as follows:

$$\text{POS\_GRP\_0} = \text{POS\_LINE}_0 \text{ OR POS\_LINE}_1 \text{ OR ... POS\_LINE}_5$$

$$\text{POS\_GRP\_1} = \text{POS\_LINE}_6 \text{ OR POS\_LINE}_7 \text{ OR ... POS\_LINE}_{11}$$

$$\vdots$$

$$\text{POS\_GRP\_17} = \text{POS\_LINE}_{100} \text{ OR POS\_LINE}_{101} \text{ OR ... POS\_LINE}_{105}$$

and $$\text{NEG\_GRP\_0} = \text{NEG\_LINE}_0 \text{ OR NEG\_LINE}_1 \text{ OR ... NEG\_LINE}_5$$

$$\text{NEG\_GRP\_1} = \text{NEG\_LINE}_6 \text{ OR NEG\_LINE}_7 \text{ OR ... NEG\_LINE}_{11}$$

$$\vdots$$

$$\text{NEG\_GRP\_17} =$$

$$\text{NEG\_LINE}_{100} \text{ OR NEG\_LINE}_{101} \text{ OR ... NEG\_LINE}_{105}$$

In the meantime, the positive leading zero line POS_LINE$_i$ is also divided into 18 groups under Pos Select 37 in row 1, each group having six bits. All 18 groups are evaluated concurrently. For each of group of 6-bits, the most significant logical "1" in each group is found. The output of the Pos Select 37 is 6 bits in which a "1" in the output signifies the position of the most significant "1" in this group and a "0" indicates a position that does not contain the most significant "1" in the group. One bit is selected from each of the 18 groups from Pos Select 37. Similarly, the negative leading one line NEG_LINE$_i$ is divided into 18 groups under Neg Select 38 in row 1, each group having six bits. All 18 groups are evaluated concurrently. For each of group of 6-bits, the most significant logical 1 in each group is found. The output of the Neg Select 38 is 6 bits in which a "1" in the output signifies the position of the most significant "1" in this group and a "0" indicates a position that does not contain the most significant "1" in the group. One bit is selected from each of the 18 groups from Neg Select 38.

In addition, the 18 bits from Pos Group 32 in row 1 are then divided into three groups under Pos Select 39 in row 2, each group having six bits. All three groups are evaluated concurrently, and one bit is chosen from each of the three groups from Pos Select 39. Similarly, the 18 bits from Neg Group 33 in row 1 are then divided into three groups under Neg Select 40 in row 2, each group having six bits. All three groups are evaluated concurrently, and one bit is chosen from each of the three groups from Neg Select 40. The output of Pos Select 39 (and similarly Neg Select 40) is 6 bits in which a "1" in the output signifies the position of the group location that contain the most significant "1" of the six groups and a "0" indicates a group position which does not contain the most significant one of the six groups.

Further, in row 3, the three bits from Pos Group 34 are sent to Pos Select 41. The output of Pos Select 41 is 3 bits in which a "1" in the output signifies the position of the group location that contains the most significant "1" of the three groups and a "0" indicates a group position that does not contain the most significant "1" of the three groups. Similarly, the three from Neg Group 35 are encoded to three bits by Neg Select 43.

The 108 bits from Pos Select 37 are sent to Pos Shift 42. Under the control of the 18-bits from Pos Select 37, 18 of the 108 input bits are selected and driven out by Pos Shift 42. These bits represent three sets of six bits that are the location of the most significant "1" within the 6-bit boundary for the possible cases where the first one lies in the first, second and third group of 36 bits in POS LINE. Neg Shift 44 produces the same bits based upon input from Neg Select 40 and Neg Select 38.

Subsequently, the normalization amounts for the third and forth normalizer levels are generated in a row 3 multiplexor 47 and a row 4 multiplexor 48, respectively. Row 3 multiplexor 47 generates the normalization shift amount of 0, 6, 12, 18, 24 or 30 based upon the sign bit from sign determination module 23 that selects between Pos Select 39 data and Neg Select 40 data and upon the selection conditions of Pos Select 41 and Neg Select 43. Row 4 multiplexor 48 generates the normalization amount of 0, 1, 2, 3, 4, or 5 based upon sign bit, Pos Select 41, the selection conditions of Neg Select 43, and the data inputs of Pos Shift 42 and Neg Shift 44.

The following two examples show how a positive sum and a negative sum are generated:

```
       6 = ... 0000 0110              2 = ... 0000 0010
      -3 = ... 1111 1101             -5 = ... 1111 1011

... pppp pgpp                  ... pppp pzgp
POS_LINE = ... 0000 010      POS_LINE = ... 0000 111
NEG_LINE = ... 0000 110      NEG_LINE = ... 0000 001
```

In order to find out the position of the first non-zero of the strings (marked by "1" in the above example), the two input operands are divided into 18 groups, each group having six bits and the logical OR of the six bits is performed within a group (denoted by 6-bit groups 32, 33). The six bits are priority encoded by Pos Select 37 and Neg Select 38 in each group to generate the mux-select signals used in Row 2. In Row 2, the six output bits are then grouped from Row 1, and 6-bit group 34, 35 and Pos Select 39 along with Neg Select 40 signals are evaluated. The sign bit is then used as mux-select signal to select either the positive normalization shift amount or the negative normalization shift amount in row 3 multiplexor 47 and row 4 multiplexor 48.

IV. Sign Determination Module

A. Sign-bit Determination Logic

The sign bit of an addition operation is determined by the most significant bits (i.e., the sign bits) of the two input operands and the carry-out bit of the sum of the two input operands. Given two n-bit signed operands: A and B, the sign bit S of the sum of A and B is obtained by:

$$S = C_0 \text{ XOR } A_0 \text{ XOR } B_0 = C_0 \text{ XOR } p_0 \quad (6)$$

where $C_0$ is the carry out of the n-bit addition of A and B. If $G_{i,\ldots,n-1}$ is defined as the generate from the $i^{th}$ bit to the $n-1^{th}$ bit of the sum of A+B, $G_{i,\ldots,n-1}$ is then given by:

$$G_{i,\ldots,n-1} = g_i + p_i G_{i+1,\ldots,n-1} \quad (7)$$

Note that $C_0$ is the same as $G_{0,\ldots,n-1}$, and is given by:

$$C_0 = G_{0,\ldots,n-1} = g_0 + p_0 G_{1,\ldots,n-1} \quad (8)$$

Therefore, equation (6) can be rewritten using the relationship of equation (7), as follows:

$$\begin{aligned}
S &= (g_0 + p_0 G_{1,\ldots,n-1}) \text{ XOR } p_0 \\
&= (g_0 + p_0 G_{1,\ldots,n-1})\overline{p}_0 + \overline{(g_0 + p_0 G_{1,\ldots,n-1})} p_0 \\
&= g_0 \overline{p}_0 + \overline{g}_0 (\overline{p}_0 + \overline{G}_{1,\ldots,n-1}) p_0
\end{aligned}$$

Using the relationships $$p_0 \overline{g}_0 = p_0, \quad g_0 \overline{p}_0 = g_0, \text{ and}$$

$$\begin{aligned}
p_0 \overline{p}_0 &= 0 \\
&= g_0 + p_0 \overline{G}_{1,\ldots,n-1} \quad (9) \\
&= g_0 + p_0 z_1 + p_0 p_1 \overline{G}_{2,\ldots,n-1} \\
&= g_0 + p_0 z_1 + p_0 p_1 z_2 + p_0 p_1 p_2 \overline{G}_{3,\ldots,n-1} \\
&= g_0 + p_0 z_1 + p_0 p_1 z_2 + p_0 p_1 p_2 z_3 + \ldots + \quad (10) \\
&\quad p_0 p_1 \ldots p_{n-2} z_{n-1} + p_0 p_1 \ldots p_{n-1}
\end{aligned}$$

Similarly, the complement signal of the sign-bit is given by from equation (9):

$$\begin{aligned}
\overline{S} &= \overline{g_0 + p_0 G_{1,\ldots,n-1}} = \overline{g}_0 (\overline{p}_0 + G_{1,\ldots,n-1}) \\
&= \overline{g}_0 \overline{p}_0 + \overline{g}_0 \overline{G}_{1,\ldots,n-1}
\end{aligned}$$

Using the relationship $$\begin{aligned}
\overline{g}_0 \overline{p}_0 &= z_0, \\
&= z_0 + \overline{g}_0 G_{1,\ldots,n-1} \quad (11) \\
&= z_0 + p_0 g_1 + p_0 p_1 G_{2,\ldots,n-1} \\
&= z_0 + p_0 g_1 + p_0 p_1 g_2 + p_0 p_1 p_2 G_{3,\ldots,n-1} \\
&= z_0 + p_0 g_1 + p_0 p_1 g_2 + p_0 p_1 p_2 z_3 + \ldots + \\
&\quad p_0 p_1 \ldots p_{n-2} z_{n-1} + p_0 p_1 \ldots p_{n-2} g_{n-1}
\end{aligned}$$

If $A_0$ and $B_0$ are interchanged with $\overline{A}_0$ and $\overline{B}_0$, respectively, equations (10) and (11) then become:

$$S = z_0 + p_0 z_1 + p_0 p_1 z_2 + p_0 p_1 p_2 z_3 + \ldots + p_0 p_1 \ldots p_{n-2} z_{n-1} + p_0 p_1 \ldots p_{n-1} \quad (12)$$

$$\overline{S} = g_0 + p_0 g_1 + p_0 p_1 g_2 + p_0 p_1 p_2 g_3 + \ldots + p_0 p_1 \ldots p_{n-2} g_{n-1} \quad (13)$$

Thus, the sign bit logic is simplified to a problem of detecting z (or p) or g signals from the input operand strings A and B.

B. Hardware Implementation

As shown in FIG. 3, sign determination module 23 includes a G_cell 52, a M_cell 53, a M_cell 54, and a S_cell 55. For the first level of reduction, the M, N, and R are generate, kill, and propagate functions, respectively, are computed in G_CELL 52 as follows:

to detect g signals, $$M_i = g_i + p_i g_{i+1} = A_i B_i + (A_i \text{ XOR } B_i) A_{i+1} B_{i+1}.$$

to detect z signals, $$N_i = z_i + p_i z_{i+1} = \bar{A}_i \bar{B}_i + (A_i \text{ XOR } B_i) \bar{A}_{i+1} \bar{B}_{i+1}$$

to detect p signals, $$R_i = p_i p_{i+1} = (A_i \text{ XOR } B_i)(A_{i+1} \text{ XOR } B_{i+1})$$

For a second level of merging, a 4-way reduction tree is utilized, and the outputs of M_cell 53 become $M_4$, $N_4$, and $R_4$, which are evaluated as follows:

$$M_4 = M(0) + R(0)M(1) + R(0)R(1)M(2) + R(0)R(1)R(2)M(3)$$

$$N_4 = N(0) + R(0)N(1) + R(0)R(1)N(2) + R(0)R(1)R(2)N(3)$$

$$R_4 = R(0)R(1)R(2)R(3)$$

The outputs of M_cell 54 are $M_4$, $N_4$, and $R_4$, which are evaluated using the above equations, as follows:

$$M_{g\_4} = M_4(0) + R_4(0)M_4(1) + R_4(0)R_4(1)M_4(2) + R_4(0)R_4(1)R_4(2)M_4(3)$$

$$N_{g\_4} = N_4(0) + R_4(0)N_4(1) + R_4(0)R_4(1)N_4(2) + R_4(0)R_4(1)R_4(2)N_4(3)$$

$$R_{g\_4} = R_4(0)R_4(1)R_4(2)R_4(3)$$

The output of S_cell 55 are two selection signals. A positive sign will be selected as the selection signal when $$M_{g\_4}(0) + R_{g\_4}(0)M_{g\_4}(1) + \\ R_{g\_4}(0)R_{g\_4}(1)M_{g\_4}(2) + R_{g\_4}(0)R_{g\_4}(1)R_{g\_4}(2)M_{g\_4}(3) = 1,$$

and a negative sign will be selected as the selection when $$N_{g\_4}(0) + R_{g\_4}(0)N_{g\_4}(1) + R_{g\_4}(0)R_{g\_4}(1)N_{g\_4}(2) + \\ R_{g\_4}(0)R_{g\_4}(1)R_{g\_4}(2)N_{g\_4}(3) + R_{g\_4}(0)R_{g\_4}(1)R_{g\_4}(2)R_{g\_4}(3) = 1.$$

As has been described, the present invention provides an improved LZA having an independent sign-bit determination module with four levels of logic. The present invention determines the shift amount in parallel with the normalization process without any interaction with the LZA.

Although two operands, each having 107 bits in length, are utilized the preferred embodiment of the present invention, it is understood by those skilled in the art that the principle as disclosed is applicable to operands of any length. Further, even though a single adder is utilized to illustrate a preferred embodiment, the present invention may also be applied to a normalized fused multiplier-adder.

While the invention has been particularly shown and described with reference to a preferred embodiment, it will be understood by those skilled in the art that various changes in form and detail may be made therein without departing from the spirit and scope of the invention.

What is claimed is:

1. An apparatus for anticipating leading zeros for an adder within a floating-point processor, said apparatus comprising:
   a leading-zero anticipator for generating a leading zeros string and a leading ones string by examining carry propagates ($p_i$), generates ($g_i$) and kills ($z_i$) of two adjacent bits of two input operands (A and B) of said adder, wherein said leading zeros string is for a positive sum and said leading ones string is for a negative sum; and
   a sign determination module for determining a sign for at sum of said two input operands, wherein said sign determination module operates in parallel with said leading-zero anticipator and in independent from said leading-zero anticipator.

2. The apparatus according to claim 1, wherein said sign is utilized to select either a positive sum or a negative sum for a proper normalization shift amount for said adder.

3. The apparatus according to claim 1, wherein a sign bit S of said sign is given by:

$$S = z_0 + p_0 z_1 + p_0 p_1 z_2 + p_0 p_1 p_2 z_3 + \cdots + p_0 p_1 \ldots p_{n-2} z_{n-1} + p_0 p_1 \cdots p_{n-1}.$$

4. The apparatus according to claim 1, wherein a complement of a sign bit S of said sign is given by:

$$\bar{S} = g_0 + p_0 g_1 + p_0 p_1 g_2 + p_0 p_1 p_2 g_3 + \cdots + p_0 p_1 \cdots p_{n-2} g_{n-1}.$$

5. The apparatus according to claim 1, wherein said sign determination module has four levels of logic blocks.

6. A floating-point processor, comprising:
   an instruction unit; and
   a floating-point unit coupled to said instruction unit, wherein said floating-point unit includes:
   an adder;
   a leading-zero anticipator for generating a leading zeros string and a leading ones string by examining carry propagates ($p_i$), generates ($g_i$) and kills ($z_i$) of two adjacent bits of two input operands (A and B) of said adder, wherein said leading zeros string is for a positive sum and said leading ones string is for a negative sum; and
   a sign determination module for determining a sign for a sum of said two input operands, wherein said sign determination module operates in parallel with said leading-zero anticipator and in independent from said leading-zero anticipator.

7. The floating-point processor according to claim 6, wherein said sign is utilized to select either a positive sum or a negative sum for a proper normalization shift amount for said adder.

8. The floating-point processor according to claim 6, wherein a sign bit S of said sign is given by:

$$S = z_0 + p_0 z_1 + p_0 p_1 z_2 + p_0 p_1 p_2 z_3 + \cdots + p_0 p_1 \cdots p_{n-2} z_{n-1} + p_0 p_1 \cdots p_{n-1}.$$

9. The floating-point processor according to claim 6, wherein a complement of a sign bit S of said sign is given by:

$$\bar{S} = g_0 + p_0 g_1 + p_0 p_1 g_2 + p_0 p_1 p_2 g_3 + \cdots + p_0 p_1 \cdots p_{n-2} g_{n-1}.$$

10. The floating-point processor according to claim 6, wherein said sign determination module has four levels of logic blocks.

\* \* \* \* \*

UNITED STATES PATENT AND TRADEMARK OFFICE
CERTIFICATE OF CORRECTION

PATENT NO. : 6,594,679 B1 Page 1 of 1
DATED : July 15, 2003
INVENTOR(S) : Lee et al.

It is certified that error appears in the above-identified patent and that said Letters Patent is hereby corrected as shown below:

<u>Column 8,</u>
Line 11, delete "at" and replace with -- a --.

Signed and Sealed this

Ninth Day of December, 2003

JAMES E. ROGAN
*Director of the United States Patent and Trademark Office*